(12) United States Patent
Ding et al.

(10) Patent No.: US 11,038,553 B2
(45) Date of Patent: Jun. 15, 2021

(54) EMC INDUCTOR-FREE RF FRONT-END METHOD AND TOPOLOGY WITH POWER BY FIELD FUNCTION FOR AN INDUCTIVELY COUPLED COMMUNICATION SYSTEM

(71) Applicant: NXP B.V., Eindhoven (NL)

(72) Inventors: Jingfeng Ding, Gratwein (AT); Gernot Hueber, Linz (AT); Erich Merlin, Gratkorn (AT)

(73) Assignee: NXP B.V., Eindhoven (NL)

( * ) Notice: Subject to any disclaimer, the term of this patent is extended or adjusted under 35 U.S.C. 154(b) by 193 days.

(21) Appl. No.: 16/215,173

(22) Filed: Dec. 10, 2018

(65) Prior Publication Data

US 2020/0186199 A1 Jun. 11, 2020

(51) Int. Cl.
*H04B 5/00* (2006.01)

(52) U.S. Cl.
CPC ......... *H04B 5/0037* (2013.01); *H04B 5/0031* (2013.01); *H04B 5/0075* (2013.01)

(58) Field of Classification Search
CPC .. H04B 5/0037; H04B 5/0075; H04B 5/0031; H04B 5/0056; Y02D 30/70
See application file for complete search history.

(56) References Cited

U.S. PATENT DOCUMENTS

| | | | |
|---|---|---|---|
| 7,683,733 B2* | 3/2010 | Li | H01F 19/04 333/25 |
| 8,559,890 B2* | 10/2013 | Merlin | H04B 5/0025 455/73 |
| 8,818,297 B2 | 8/2014 | Merlin | |
| 9,401,739 B2 | 7/2016 | Pieber et al. | |
| 10,110,281 B2* | 10/2018 | Ding | H04B 5/005 |
| 10,200,091 B2* | 2/2019 | Ding | H04B 5/0031 |
| 10,361,474 B2* | 7/2019 | Ding | H01Q 1/243 |
| 10,516,445 B2* | 12/2019 | Hueber | H04W 4/80 |
| 2009/0195324 A1* | 8/2009 | Li | H01F 19/04 333/25 |
| 2014/0018017 A1* | 1/2014 | Merlin | H04B 5/0037 455/90.1 |
| 2017/0019783 A1* | 1/2017 | Van Bosch | H04B 5/0031 |
| 2018/0269560 A1* | 9/2018 | Ding | G06K 7/10237 |

(Continued)

OTHER PUBLICATIONS

U.S. Appl. No. 15/621,286, filed Jun. 13, 2017.

*Primary Examiner* — Jared Fureman
*Assistant Examiner* — Michael J Warmflash
(74) *Attorney, Agent, or Firm* — Shuqian Yan (57) ABSTRACT

A near field communication (NFC) device capable of operating by being powered by the field includes an NFC module for generating an electromagnetic carrier signal and modulating the carrier signal according to data to be transmitted, and an antenna circuit coupled to and driven by said NFC module with the modulated carrier signal. The device includes an RF front end coupled between said NFC module and said antenna circuit. The RF front end includes a balanced to unbalanced (Balun) transformer and a tuning capacitor to provide a function of an electromagnetic compatibility (EMC) filter. A powered by the field circuit of the NFC device is adapted to harvest energy from an external field to power said NFC device. The power by the field circuit is coupled to said Balun transformer via one or more impedance elements.

20 Claims, 5 Drawing Sheets

(56) References Cited

U.S. PATENT DOCUMENTS

| | | | |
|---|---|---|---|
| 2018/0269929 A1* | 9/2018 | Ding | H01Q 1/242 |
| 2018/0359005 A1* | 12/2018 | Ding | H04W 88/06 |
| 2019/0132021 A1* | 5/2019 | Khatib | H03F 3/19 |
| 2019/0319672 A1* | 10/2019 | Hueber | H04W 4/80 |
| 2020/0186199 A1* | 6/2020 | Ding | H04B 5/0056 |

* cited by examiner

EMC INDUCTOR-FREE RF FRONT-END METHOD AND TOPOLOGY WITH POWER BY FIELD FUNCTION FOR AN INDUCTIVELY COUPLED COMMUNICATION SYSTEM

The present disclosure generally relates to contactless communication, and more specifically, to a near field communication (NFC) device capable of operating by being powered by the field and an RF front end of said NFC device.

NFC is widely used in a variety of applications including mobile devices, e.g., smartphones and tablets, to establish radio communication with each other by touching them together or bringing them into close proximity such as a few to several centimeters or inches. NFC-enabled mobile devices may be used for ticketing, access control systems, payment services, etc. Usually, the NFC module equipped in a mobile device is powered by the hosting mobile device via some sort of autonomous energy sources due to their mobile character. Such energy sources are usually batteries or accumulators, which can be recharged.

However, it is conceivable that the readiness of operation of the mobile device is not always guaranteed as the battery or the accumulator is unloaded or exhausted. Therefore, it is possible that the NFC functionality of the mobile device is not always available when needed. This, of course, creates problems for a user when he needs to transfer ticket data or access data via secure NFC in order to access a building, a train or train station, a laboratory room, etc. There is a strong demand that the NFC module equipped in a mobile device must still be operable when the battery has been exhausted in order to keep the NFC functionality available. This demand has resulted in considerations of using electric energy that is provided by an electromagnetic field generated by an external reading device. This so called "powered by the field mode" has already been implemented in standard NFC cards and standard cards where a powered by the field circuitry is directly connected with the antenna.

Figure 1:
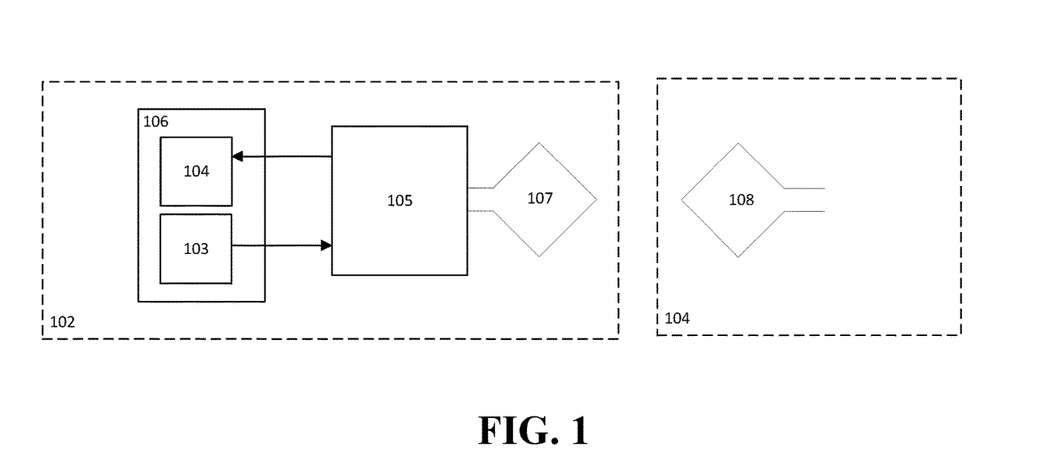
FIG. 1 is an example inductively coupled communication system.

FIG. 1 depicts an example inductively coupled communication system. Communication system 100 may include a first communication device 102 and a second communication device 104. Communication device 102 and communication device 104 communicate with each other using inductively coupled communication. For example, the inductively coupled communication may be NFC. Examples of communication devices include wireless communication devices, cellular phones, smartphones, tablet devices, voice recorders, digital cameras, still cameras, camcorders, gaming systems, laptop computers, etc.

In inductively coupled communication, the first device 102 may generate an electromagnetic field to which the second device 104 may be coupled. For example, in the case of NFC, the direction for the data flow may be characterized by having the first device 102 (also referred to as a polling device, proximity coupling device (PCD), reader or initiator) provide the electromagnetic field. The second device 104 (also referred to as a listener, listening device, proximity integrated circuit card (PICC), tag or target) may communicate with the first device 102 by generating modulation content.

As depicted in FIG. 1, the first device 102 may include a transmitter 103 and a receiver 104. The transmitter and receiver may be part of an NFC module 106, such as type no. PN5xx manufactured by NXP Semiconductors. The first device 102 may further include an RF front end module 105 and an antenna 107. The second device 104 may include an antenna 108, which is inductively coupled to the antenna 107.

Figure 2:
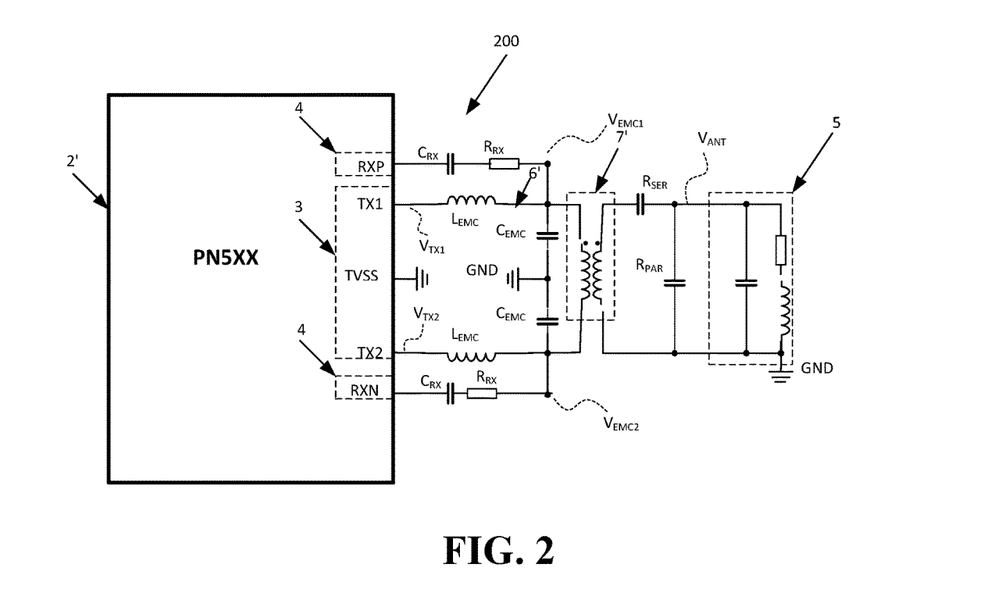
FIG. 2 is an example NFC device.

FIG. 2 is an exemplary NFC device using a single-ended antenna. As shown in FIG. 2, the NFC device includes an NFC module 2', such as type no. PN5xx manufactured by NXP Semiconductors. NFC module 2' may include a transmitter 3 being adapted to generate an electromagnetic carrier signal, to modulate the carrier signal according to data to be transmitted and to drive an antenna circuit 5 with the modulated carrier signal. NFC module 2' may further include a receiver 4 being adapted to sense response signals being received at antenna circuit 5 and to demodulate the response signals. NFC module 2' has output terminals TX1 and TX2 coupled to respective first and second transmitting paths wherein the first and second transmitting paths are coupled to antenna circuit 5. Between the output terminals TX1 and TX2 and antenna circuit 5, the following devices may be switched into the transmitting paths: an electromagnetic compatibility (EMC) filter 6' comprising two inductors $L_{EMC}$ and two capacitors $C_{EMC}$, a balanced to unbalanced (Balun) transformer 7' for converting differential antenna matching network to single-end antenna matching network, and an impedance matching network (not shown). It should be noticed that the NFC device of FIG. 2 is not capable of operating by being powered by the field.

Figure 3:
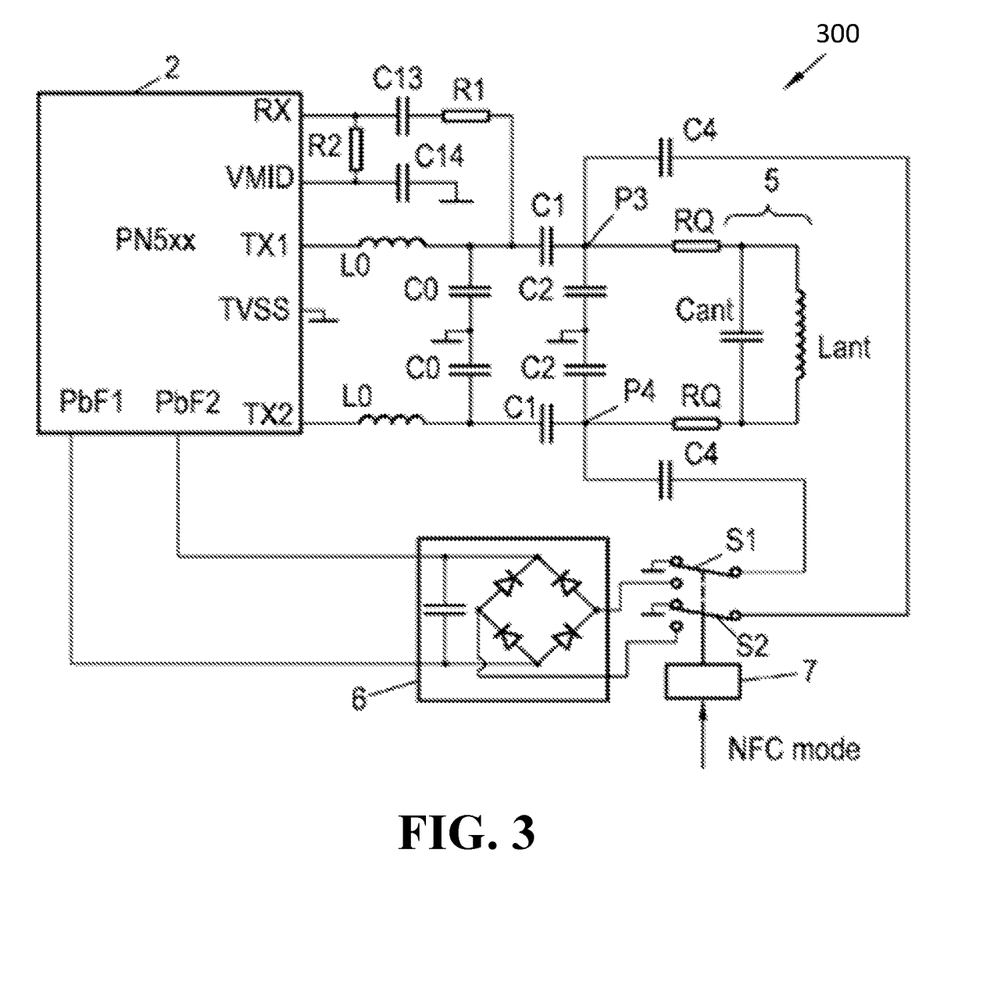
FIG. 3 is another example NFC device.

FIG. 3 is an exemplary NFC device using a differential antenna. A Balun transformer is not used for this implementation as the system is fully differential. As shown in FIG. 3, a powered by the field circuitry 6 is coupled to the antenna circuit 5 via AC coupling capacitors C4. The powered by the field circuitry may include a rectifier and a limiter. Further, a pair of switches S1 and S2 are used, which are controlled by mode selection means 7. Mode selection means 7 is adapted to switch the outputs of the switches S1 and S2 to ground in a reader mode and optionally in a card mode, so that the second terminals of the AC coupling capacitors C4 are drawn to ground potential, and to switch the outputs of the switches S1 and S2 to the inputs of powered by the field circuitry 6 in a powered by the field mode, such that AC electric energy is fed via the AC coupling capacitors C4 to the inputs of powered by the field circuitry 6 where it is converted into DC electric energy to be used for supplying NFC module 2. It should be noticed that the switches S1 and S2, mode selection means 7, and/or powered by the field circuitry 6 may be configured as discrete components or integrated in NFC module 2.

The NFC device of FIG. 3 as discussed above is capable of operating by being powered by the field radiated by a terminal with which it communicates and without using the power of the device battery. However, the powered by the field circuitry of said NFC device may limit the amount of its output voltage resulting in reduced output power when the NFC device actively transmits in a reader mode or in a card mode.

Inductively coupled communication systems such as NFC present a number of design challenges. One such design challenge is that the analog front end of NFC communication devices must be capable of accommodating multiple modes of operation (reader/writer, peer-to-peer, and card emulation). Challenges associated with RF front end design may include, but are not limited to the following: interference from transmitter to receiver, impedance matching from transmitter to antenna and antenna to receiver, BOM of components in the front-end (cost per device related to PCB area, manufacturing, testing, etc.), component variation used in the front-end, significant losses in the EMC inductors, crosstalk between the EMC inductors, un-wanted coupling from EMC to other components, to name just a few. As a result of these design challenges associated with producing communication devices of minimal size, weight, complexity, power consumption, and cost there exists a need for an improved RF front end topology in an NFC communication device.

SUMMARY

A device for contactless communication includes an NFC module being adapted to generate an electromagnetic carrier signal and to modulate the carrier signal according to data to be transmitted; an antenna circuit coupled to and driven by said NFC module with the modulated carrier signal; and an RF front end coupled between said NFC module and said antenna circuit. Said RF front end includes a balanced to unbalanced (Balun) transformer and a tuning capacitor adapted to provide a function of an electromagnetic compatibility (EMC) filter. Said NFC module further includes a powered by the field (PBF) circuit adapted to harvest energy from an external field to power said device. Said powered by the field circuit has a first terminal coupled to a first terminal of said Balun via a first impedance block and a second terminal coupled to a second terminal of said Balun via a second impedance block. Said device is adapted to be able to operate in a powered by the field card mode.

In one example embodiment, said first impedance block includes a first impedance element internal to the NFC module and a second impedance element external to the NFC module, said first and second impedance elements being arranged in series. And said second impedance block includes a third impedance element internal to the NFC module and a fourth impedance element external to the NFC module, said third and fourth impedance elements being arranged in series.

In one example embodiment, said first impedance element is further coupled to a first switch, said first impedance and said first switch being arranged in parallel. And said third impedance element is further coupled to a second switch, said third impedance element and said second switch being arranged in parallel.

In one example embodiment, said first and second switches are configured to be closed when said device operates in the powered by the field card mode.

In one example embodiment, said first and second switches are configured to be open when said device operates in a reader mode.

In one example embodiment, said first impedance block includes a first impedance element external to the NFC module. And said second impedance block includes a second impedance element external to the NFC module.

In one example embodiment, said first impedance element is further connected in series with a first switch, said first switch being internal to the NFC module. And said second impedance element is further connected in series with a second switch, said second switch being internal to the NFC module.

In one example embodiment, said Balun transformer is connected to the ground.

In one example embodiment, said antenna circuit is a differential antenna.

In one example embodiment, said device is incorporated in a mobile device and adapted to be powered by the mobile device.

In one example embodiment, said device is adapted to be able to operate in a reader mode.

In one example embodiment, said device is adapted to perform active load modulation (ALM) in a card mode.

In one example embodiment, said device is adapted to perform passive load modulation (PLM) in the powered by the field card mode.

A mobile device includes an NFC module being adapted to generate an electromagnetic carrier signal and to modulate the carrier signal according to data to be transmitted; and an antenna circuit coupled to and driven by said NFC module with the modulated carrier signal; and an RF front end coupled between said NFC module and said antenna circuit. Said RF front end includes a balanced to unbalanced (Balun) transformer and a tuning capacitor adapted to provide a function of an electromagnetic compatibility (EMC) filter. Said NFC module further includes a powered by the field (PBF) circuit adapted to harvest energy from an external field to power said mobile device. Said powered by the field circuit is coupled to said Balun via one or more impedance elements. Said mobile device is adapted to be able to operate in a powered by the field card mode.

The above discussion is not intended to represent every example embodiment or every implementation within the scope of the current or future Claim sets.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

The example embodiments as will be discussed below disclose an NFC device capable of operating by being powered by the field using a differential antenna configuration. The NFC device supports various NFC functionality as will be discussed below in more detail.

Figure 4:
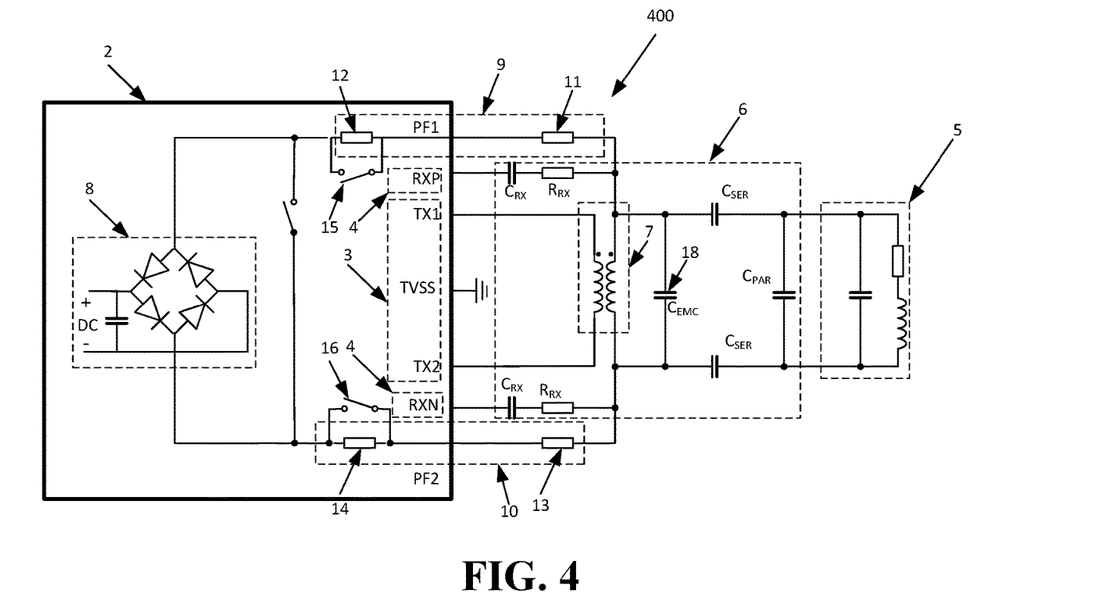
FIG. 4 is a first embodiment of an NFC device.

FIG. 4 is a first embodiment of an NFC device. As shown in FIG. 4, the NFC device includes an NFC module 2 having a transmitter 3 and a receiver 4. Transmitter 3 generates an electromagnetic carrier signal. The carrier signal is modulated according to data to be transmitted. An antenna circuit 5 is driven with the modulated carrier signal, NFC module 2 has output terminals TX1 and TX2 being coupled to first and second transmitting paths wherein the first and second transmitting paths are coupled to antenna 5.

The NFC device 400 further includes an RF front end module 6 being coupled between the NFC module 2 and antenna circuit 5. The RF front end module 6 may include a balanced to unbalanced (Balun) transformer 7, a parallel capacitor $C_{EMC}$ 18, two series capacitors $C_{SER}$ and one parallel capacitor $C_{PAR}$ in the transmitting paths, a decoupling capacitor $C_{RX}$ and a resistor $R_{RX}$ in the receiving paths. Receiver 4 is well known to those skilled in the art, and thus would not be explained in further detail.

In this embodiment, instead of using two inductors $L_{EMC}$ and two capacitors $C_{EMC}$ (a dedicated LC coupled to each output terminals TX1 and TX2 such as depicted in FIG. 2) to provide the function of an EMC filter, the EMC filtering function is achieved by an equivalent inductance of the Balun transformer 7 and the parallel capacitor $C_{EMC}$ 18. Thus, this embodiment effectively reduces the number of components used in the RF front end module by eliminating at least two inductors ($L_{EMC}$) from the topology, which are considered to be the bulkiest, most expensive, and most lossy components in the RF front end module. The EMC filtering function achieved by this embodiment may be an EMC low-pass filter.

Further advantages of this embodiment may include an increase in output power and power efficiency.

NFC module 2 may further include a powered by the field circuit 8, which is adapted to harvest energy from an external electromagnetic (EM) field by converting AC electric energy into DC electric energy to be used for supplying NFC module 2 and/or the NFC device. The powered by the field circuit may include a rectifier and a limiter.

As depicted in FIG. 4, a first input terminal of said powered by the field circuit is connected to said Balun transformer 7 via a first impedance block 9, and a second input terminal of said powered by the field circuit is connected to said Balun transformer 7 via a second impedance block 10. Each of said first and second impedance blocks includes at least one impedance element, which may be one of a resistor, an inductor, a capacitor, and a combination thereof.

In this embodiment, first impedance block 9 includes an impedance element 11 external to the NFC module and an impedance element 12 internal to the NFC module and arranged in series with impedance element 11. In one embodiment, second impedance block 10 includes an impedance element 13 external to NFC module 2 and an impedance element 14 internal to said NFC module and arranged in series with impedance element 13.

It should be noted that "internal to the/said NFC module" as used throughout the disclosure means the particular element is integrated inside the NFC module, whereas "external to the/said NFC module" means the particular element is a discrete or separate element from the NFC module.

In this embodiment, impedance element 12 is further coupled to a first switch 15 and arranged in parallel with said first switch. In this embodiment, impedance element 14 is further coupled to a second switch 16 and arranged in parallel with said second switch. Said first and second switches can be configured depending on the operating mode of the NFC device. For example, said first and second switches are configured to be closed when the NFC device operates in a powered by the field mode. This enables more power to be harvested from the external field by the powered by the field circuit. On the other hand, said switches are configured to be open when the NFC device is actively transmitting such as in a reader mode. By opening the switches, more current flows into the receiver of said NFC module, resulting in more output power when the NFC device is actively transmitting.

The NFC device of FIG. 4 is capable of operating in each of a reader mode, a battery supplied card mode, and a powered by the field card mode without using the power of the device battery. In the card mode, the NFC device is adapted to perform active load modulation (ALM) or passive load modulation (PLM) when it is actively transmitting. When active load modulation occurs, the powered by the field circuitry of said NFC device may be switched off in order not to degrade the RF performance. In the case that no power is supplied from a battery, the NFC device performs passive load modulation in the powered by the field card mode when the device is transmitting.

The NFC device of FIG. 4 may be incorporated into a mobile device, e.g., a mobile phone, and adapted to be powered by the mobile device.

Figure 5:
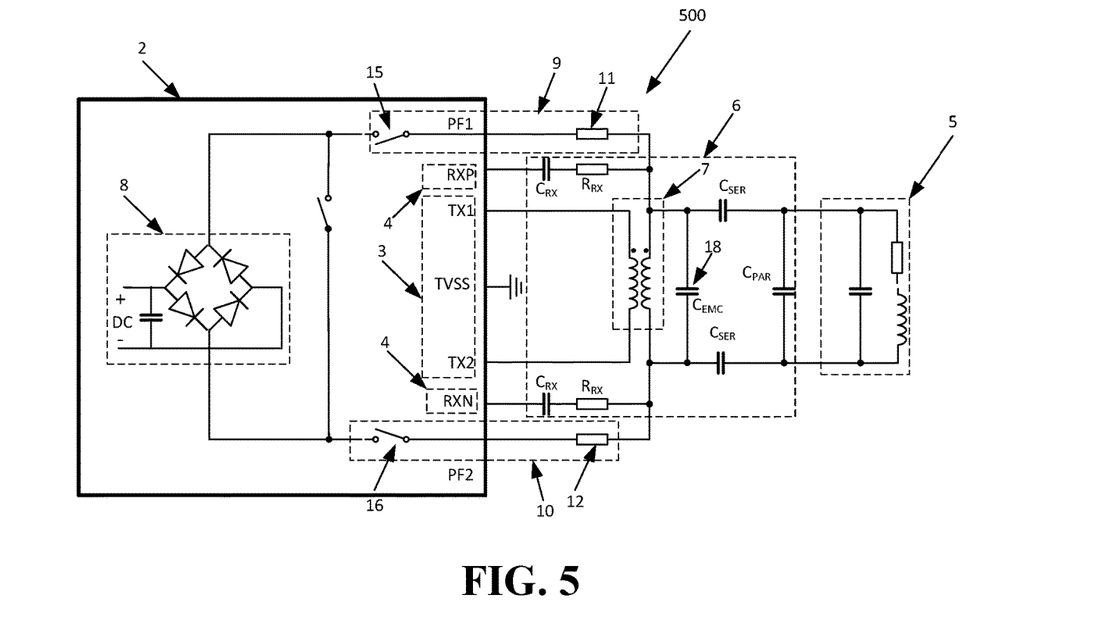
FIG. 5 is a second embodiment of the NFC device.

FIG. 5 is a second embodiment of the NFC device using a differential antenna. This second embodiment and the first embodiment of FIG. 4 have much in common. The main difference lies in how the powered by the field circuit 8 may be connected to the Balun transformer as explained in detail below.

As shown in FIG. 5, a first input terminal of the powered by the field circuit is connected to the Balun transformer via a first impedance block 9, and a second input terminal of said powered by the field circuit is connected to the Balun transformer via a second impedance block 10. In this embodiment, first impedance block 9 includes impedance element 11 external to said NFC module, and second impedance block 10 includes impedance element 12 external to said NFC module. Each of said first and second impedance elements may be one of a resistor, an inductor, a capacitor, and a combination thereof.

As depicted in FIG. 5, impedance element 11 is further arranged in series with a first switch 15, which is internal to said NFC module. Similarly, impedance element 12 is further arranged in series with a second switch 16, which is internal to said NFC module. Said first and second switches can be configured depending on the operating mode of said NFC device. For example, said first and second switches are configured to be closed when the NFC device operates in a powered by the field mode. This enables more power to be harvested from the external field by the powered by the field circuit. On the other hand, said switches are configured to be open when the NFC device is actively transmitting such as in a reader mode. By opening the switches, more current flows into the receiver of said NFC module, resulting in more output power when the NFC device is actively transmitting.

As with the NFC device of FIG. 4, the NFC device of FIG. 5 is also capable of operating in each of a reader mode, a battery supplied card mode, and a powered by the field card mode without using the power of the device battery. In the card mode, the NFC device is adapted to perform active load modulation (ALM) or passive load modulation (PLM) when the device is actively transmitting. In the case that power is not supplied by a battery, the NFC device performs passive load modulation in the powered by the field card mode when the device is transmitting.

In this embodiment, the EMC filtering function is achieved by an equivalent inductance of the Balun transformer 7 and the parallel capacitor $C_{EMC}$ 18. Thus, this embodiment effectively reduces the number of components used in the RF front end by eliminating at least two inductors ($L_{EMC}$) from the topology.

The NFC device of FIG. 5 may be incorporated into a mobile device, e.g., a mobile phone, and adapted to be powered by the mobile device.

Figure 6:
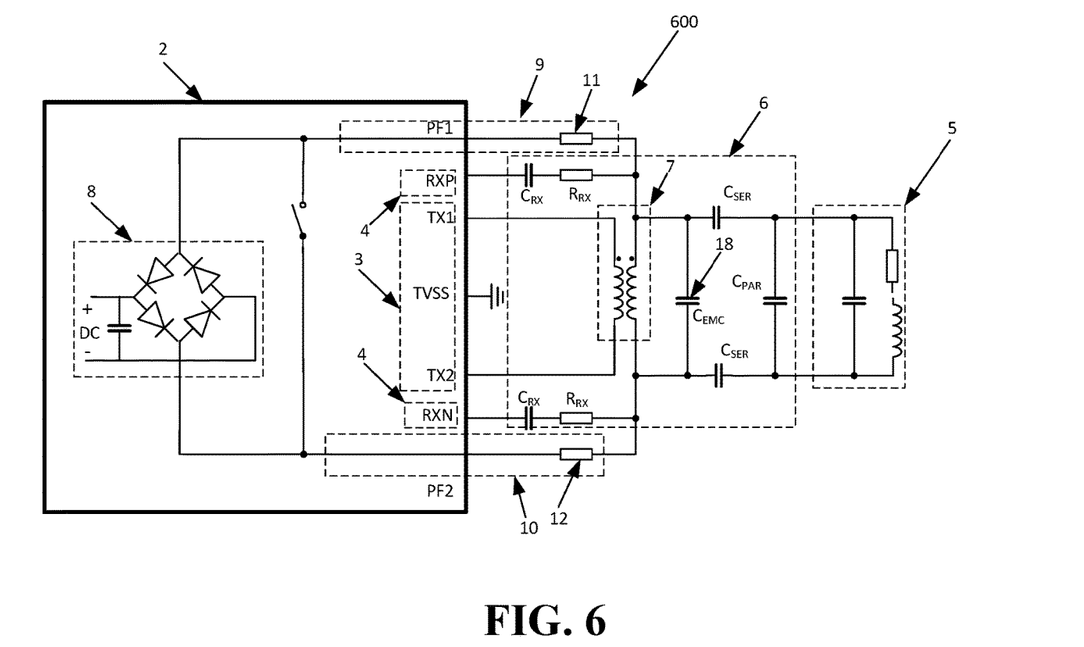
FIG. 6 is a third embodiment of the NFC device.

FIG. 6 is a further example embodiment of an NFC device using a differential antenna. As with the embodiments discussed above in reference to FIG. 4 and FIG. 5, the main difference lies in how the powered by the field circuit 8 is connected to said Balun transformer as explained in detail below.

As shown in FIG. 6, a first input terminal of said powered by the field circuit is connected to a first output terminal of said Balun transformer via a first impedance block 9, and a second input terminal of said powered by the field circuit is connected to a second output terminal of said EMC filter via a second impedance block 10. In this embodiment, first impedance block 9 includes impedance element 11 external to said NFC module, and second impedance block 10 includes impedance element 12 external to said NFC module. Each of said first and second impedance elements may be one of a resistor, an inductor, a capacitor, and a combination thereof. It should be noted that this embodiment of NFC device does not use one or more switches coupled between the powered by the field circuit and the EMC filter.

The NFC device of FIG. 6 is also capable of operating in each of a reader mode, a battery supplied card mode, and a powered by the field card mode without using the power of the device battery. In the card mode, the NFC device is adapted to perform active load modulation (ALM) or passive load modulation (PLM) when the device is actively transmitting. In the case that power is not supplied by a battery, the NFC device performs passive load modulation in the powered by the field card mode when the device is transmitting.

In this embodiment, the EMC filtering function is achieved by an equivalent inductance of the Balun transformer 7 and the parallel capacitor $C_{EMC}$ 18. Thus, this embodiment effectively reduces the number of components used in the RF front end by eliminating at least two inductors ($L_{EMC}$) from the topology.

The NFC device of FIG. 6 may be incorporated into a mobile device, e.g., a mobile phone, and adapted to be powered by the mobile device.

Figure 7:
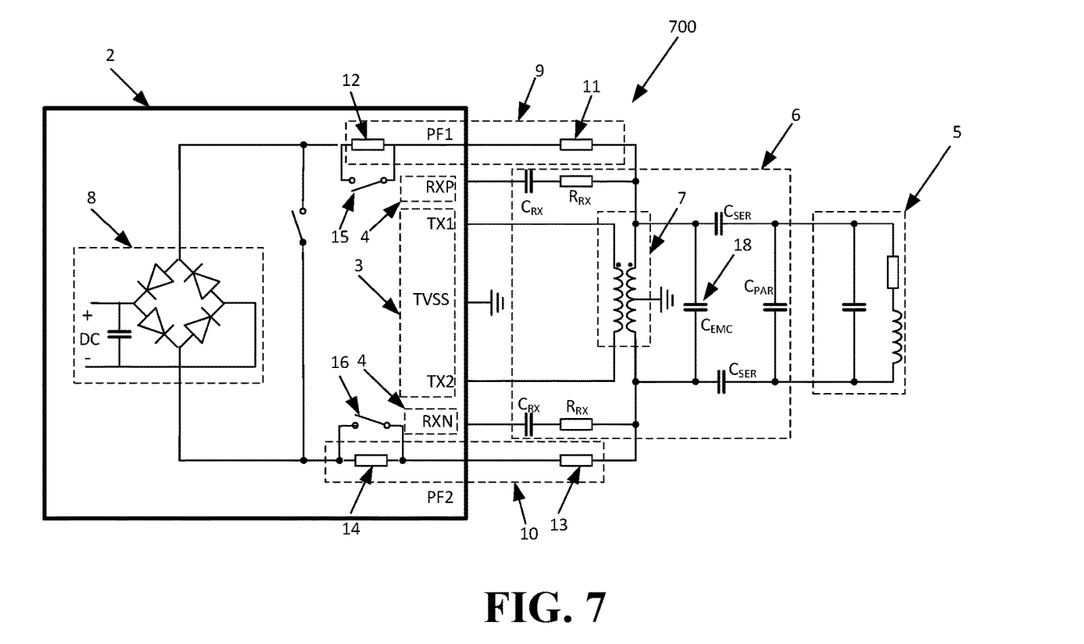
FIG. 7 is a fourth embodiment of the NFC device.

FIG. 7 is a fourth embodiment of the NFC device using a differential antenna. The NFC device of FIG. 7 shares many similarities with the above-described embodiments. A notable difference between the instant embodiment and the previous embodiments is that the center tap of the Balun transformer 7 is grounded as depicted in the figure.

In this embodiment, the EMC filtering function is achieved by an equivalent inductance of the Balun transformer 7 and the parallel capacitor $C_{EMC}$ 18. Thus, this embodiment effectively reduces the number of components used in the RF front end by eliminating at least two inductors ($L_{EMC}$) from the topology.

The discussion below focuses on how the powered by the field circuit may be connected to the Balun.

As depicted in FIG. 7, a first input terminal of said powered by the field circuit 8 is connected to a first output terminal of said Balun transformer 7 via a first impedance block 9, and a second input terminal of said powered by the field circuit is connected to a second output terminal of said Balun via a second impedance block 10. Each of said first and second impedance blocks includes at least one impedance element, which may be one of a resistor, an inductor, a capacitor, and a combination thereof.

In this embodiment, first impedance block 9 includes an impedance element 11 external to NFC module 2 and an impedance element 12 internal to said NFC module and arranged in series with impedance element 11. Similarly, second impedance block 10 includes an impedance element 13 external to NFC module 2 and an impedance element 14 internal to said NFC module and arranged in series with impedance element 13.

In this embodiment, impedance element 12 is further coupled in parallel with a first switch 15. Similarly, impedance element 14 is further coupled in parallel with a second switch 16. Said first and second switches can be configured depending on the operating mode of said NFC device. For example, said first and second switches are configured to be closed when the NFC device operates in a powered by the field mode. This enables more power to be harvested from the external field by the powered by the field circuit. On the other hand, said switches are configured to be open when the NFC device is actively transmitting such as in a reader mode. By opening the switches, more current flows into the receiver of said NFC module, resulting in more output power when the NFC device is actively transmitting.

The NFC device of FIG. 7 is capable of operating in each of a reader mode, a battery supplied card mode, and a powered by the field card mode without using the power of the device battery. In the card mode, the NFC device is adapted to perform active load modulation (ALM) or passive load modulation (PLM) when it is actively transmitting. When active load modulation is performed, the powered by the field circuitry of said NFC device may be switched off in order not to degrade the RF performance. In the case that no power is supplied from a battery, the NFC device performs passive load modulation in the powered by the field card mode when the device is transmitting.

In one embodiment, the NFC device of FIG. 7 is incorporated into a mobile device, e.g, a mobile phone, and adapted to be powered by the mobile device.

Figure 8:
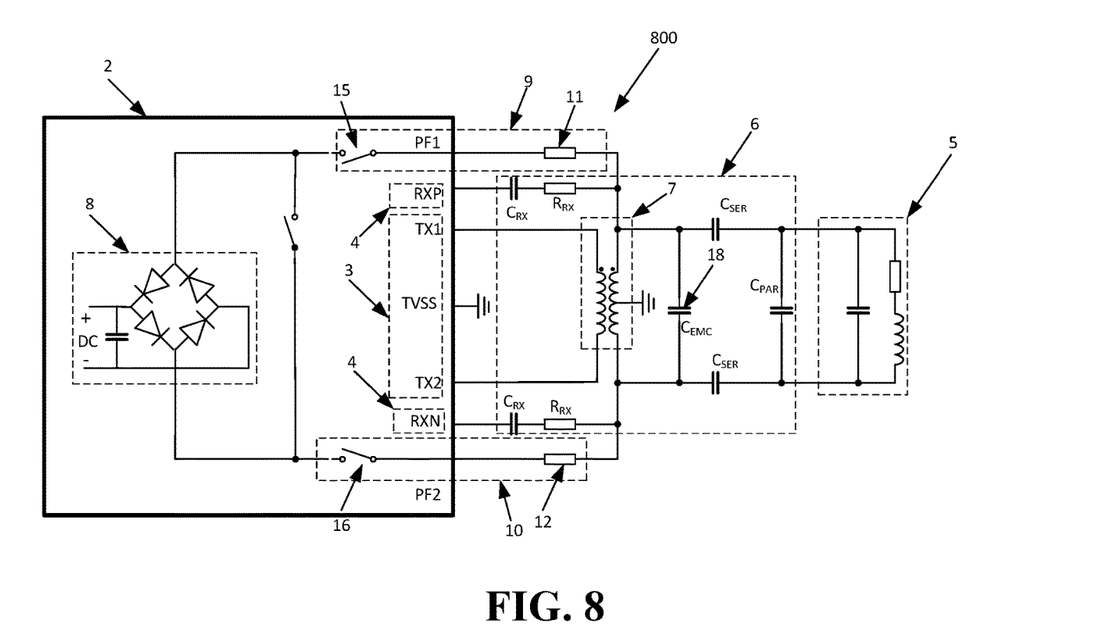
FIG. 8 is a fifth embodiment of the NFC device.

FIG. 8 is another embodiment of the NFC device using a differential antenna. As depicted in FIG. 8, the center tap of the Balun transformer 7 is grounded.

In this embodiment, the EMC filtering function is achieved by an equivalent inductance of the Balun transformer 7 and the parallel capacitor $C_{EMC}$ 18. Thus, this embodiment effectively reduces the number of components used in the RF front end by eliminating at least two inductors ($L_{EMC}$) from the topology.

As shown in FIG. 8, a first input terminal of said powered by the field circuit is connected to a first output terminal of said Balun via a first impedance block 9, and a second input terminal of said powered by the field circuit is connected to a second output terminal of said Balun via a second impedance block 10. In this embodiment, first impedance block 9 includes an impedance element 11 external to said NFC module, and second impedance block 10 includes an impedance element 12 external to said NFC module. Each of said first and second impedance elements may be one of a resistor, an inductor, a capacitor, and a combination thereof.

As depicted in FIG. 8, impedance element 11 is further arranged in series with a first switch 15, which is internal to the NFC module. Similarly, impedance element 12 is further arranged in series with a second switch 16, which is internal to the NFC module. Said first and second switches may be configured depending on the operating mode of said NFC device as explained previously with respect to FIG. 7.

The NFC device of FIG. 8 is capable of operating in each of a reader mode, a battery supplied card mode, and a powered by the field card mode without using the power of the device battery. In the card mode, the NFC device is adapted to perform to active load modulation (ALM) or passive load modulation (PLM). In the case that power is not supplied by a battery, the NFC device performs passive load modulation in the powered by the field card mode when the device is transmitting.

The NFC device of FIG. 8 may be incorporated into a mobile device, e.g., a mobile phone, and adapted to be powered by the mobile device.

Figure 9:
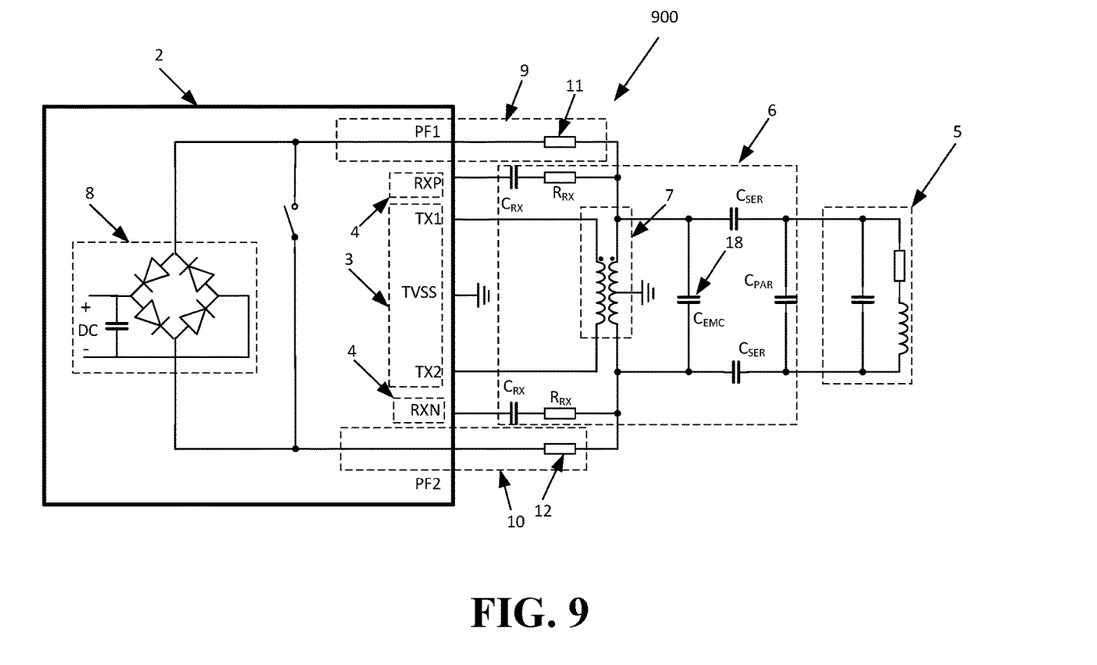
FIG. 9 is a sixth embodiment of the NFC device.

FIG. 9 is a further embodiment of the NFC device using a differential antenna. As depicted in FIG. 9, the center tap of the Balun transformer 7 is grounded.

In this embodiment, the EMC filtering function is achieved by an equivalent inductance of the Balun transformer 7 and the parallel capacitor $C_{EMC}$ 18. Thus, this embodiment effectively reduces the number of components used in the RF front end by eliminating at least two inductors ($L_{EMC}$) from the topology.

As shown in FIG. 9, a first input terminal of said powered by the field circuit is connected to a first output terminal of said Balun via a first impedance block 9, and a second input terminal of said powered by the field circuit is connected to a second output terminal of said Balun via a second impedance block 10. In this embodiment, first impedance block 9 includes an impedance element 11 external to said NFC module, and second impedance block 10 includes an impedance element 12 external to said NFC module. Each of said first and second impedance elements may be one of a resistor, an inductor, a capacitor, and a combination thereof.

The NFC device of FIG. 9 is also capable of operating in each of a reader mode, a battery supplied card mode, and a powered by the field card mode without using the power of the device battery. In the card mode, the NFC device is adapted to perform to either active load modulation (ALM) or passive load modulation (PLM) when the device is actively transmitting. In the case that power is not supplied by a battery, the NFC device performs passive load modulation in the powered by the field card mode when the device is transmitting.

Furthermore, the NFC device of FIG. 9 may be incorporated into a mobile device, e.g., a mobile phone, and adapted to be powered by the mobile device.

It should be noted that the powered by the field circuit incorporated in the above example embodiments is fully differential. However, it may also be implemented using either the high side bridge or the low side bridge.

It should be noted that whether an impedance element is internal or external to the NFC module is arbitrary. For example, the first embodiment as depicted in FIG. 4 illustrates an impedance element internal to the NFC module and another impedance element external to the NFC module for each impedance block, whereas the second and third example embodiments as depicted in FIG. 5 and FIG. 6 respectively illustrate an impedance element external to the NFC module. Alternative embodiment may be implemented using an impedance element internal to the NFC module only. Likewise, whether the switches (e.g., switches 15 and 16) are internal or external to the NFC module may also be arbitrary.

It should be noted that the above-mentioned embodiments illustrate rather than limit the invention, and that those skilled in the art will be able to design many alternative embodiments without departing from the scope of the appended claims. It is intended that the following claims cover all possible example embodiments.

In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A device for contactless communication comprising:
   an NFC module being adapted to generate an electromagnetic carrier signal and to modulate the carrier signal according to data to be transmitted;
   an antenna circuit coupled to and driven by said NFC module with the modulated carrier signal;
   an RF front end coupled between said NFC module and said antenna circuit;
   wherein said RF front end includes a balanced to unbalanced (Balun) transformer and a tuning capacitor, said Balun transformer and said tuning capacitor being adapted to provide a function of an electromagnetic compatibility (EMC) filter;
   wherein said NFC module includes a powered by the field (PBF) circuit adapted to harvest energy from an external field to power said device;
   wherein said powered by the field circuit having a first terminal coupled to a first terminal of said Balun transformer via a first impedance block and a second terminal coupled to a second terminal of said Balun transformer via a second impedance block;
   said device being adapted to be able to operate in a powered by the field card mode.

2. The device of claim 1,
   wherein said first impedance block includes a first impedance element internal to the NFC module and a second impedance element external to the NFC module, said first and second impedance elements being arranged in series; and
   wherein said second impedance block includes a third impedance element internal to the NFC module and a fourth impedance element external to the NFC module, said third and fourth impedance elements being arranged in series.

3. The device of claim 2,
   wherein said first impedance element is further coupled to a first switch, said first impedance element and said first switch being arranged in parallel; and
   wherein said third impedance element is further coupled to a second switch, said third impedance element and said second switch being arranged in parallel.

4. The device of claim 3, wherein said first and second switches are configured to be closed when said device operates in the powered by the field card mode.

5. The device of claim 3, wherein said first and second switches are configured to be open when said device operates in a reader mode.

6. The device of claim 3, wherein said Balun transformer is connected to ground.

7. The device of claim 1,
   wherein said first impedance block includes a first impedance element external to the NFC module; and
   wherein said second impedance block includes a second impedance element external to the NFC module.

8. The device of claim 7,
   wherein said first impedance element is further connected in series with a first switch, said first switch being internal to the NFC module; and wherein said second impedance element is further connected in series with a second switch, said second switch being internal to the NFC module.

9. The device of claim 8, wherein said Balun transformer is connected to ground.

10. The device of claim 7, wherein said Balun transformer is connected to ground.

11. The device of claim 1, wherein said antenna circuit is a differential antenna.

12. The device of claim 1, wherein said device is incorporated in a mobile device and adapted to be powered by the mobile device.

13. The device of claim 1, wherein said device is adapted to be able to operate in a reader mode.

14. The device of claim 1, wherein said device is adapted to perform active load modulation (ALM) in a card mode.

15. The device of claim 1, wherein said device is adapted to perform passive load modulation (PLM) in the powered by the field card mode.

16. A mobile device comprising:
an NFC module being adapted to generate an electromagnetic carrier signal and to modulate the carrier signal according to data to be transmitted;
an antenna circuit coupled to and driven by said NFC module with the modulated carrier signal; and
an RF front end coupled between said NFC module and said antenna circuit;
wherein said RF front end includes a balanced to unbalanced (Balun) transformer and a tuning capacitor to provide a function of an electromagnetic compatibility (EMC) filter;
wherein said NFC module includes a powered by the field (PBF) circuit adapted to harvest energy from an external field to power said mobile device;
said powered by the field circuit being coupled to said Balun transformer via one or more impedance elements;
said mobile device being adapted to be able to operate in a powered by the field card mode.

17. The mobile device of claim 16, wherein said Balun transformer is connected to ground.

18. The mobile device of claim 16, wherein the antenna circuit is a differential antenna.

19. The mobile device of claim 16, wherein the mobile device is adapted to perform passive load modulation (PLM) in the powered by the field card mode.

20. The mobile device of claim 16, wherein said powered by the field circuit has a first terminal coupled to a first terminal of said Balun transformer via a first impedance block and a second terminal coupled to a second terminal of said Balun transformer via a second impedance block.

* * * * *